United States Patent
Sandström et al.

(10) Patent No.: US 11,378,809 B2
(45) Date of Patent: Jul. 5, 2022

(54) REFLECTIVE OPTICAL BEAM CONDITIONERS WITH INTEGRATED ALIGNMENT FEATURES

(71) Applicant: Edmund Optics, Inc., Barrington, NJ (US)

(72) Inventors: Lars G. Sandström, Philadelphia, PA (US); Lucas J. Willis, Cherry Hill, NJ (US); Scott W. Sparrold, Nazareth, PA (US); Nir Pony, Highland Park, NJ (US); Jared A. Talbot, Hamilton, NJ (US)

(73) Assignee: Edmunc Optics, Inc., Barrington, NJ (US)

( * ) Notice: Subject to any disclaimer, the term of this patent is extended or adjusted under 35 U.S.C. 154(b) by 29 days.

(21) Appl. No.: 16/964,973

(22) PCT Filed: Jan. 24, 2019

(86) PCT No.: PCT/US2019/014929
§ 371 (c)(1),
(2) Date: Jul. 25, 2020

(87) PCT Pub. No.: WO2019/147791
PCT Pub. Date: Aug. 1, 2019

(65) Prior Publication Data
US 2021/0048681 A1     Feb. 18, 2021

Related U.S. Application Data

(60) Provisional application No. 62/622,339, filed on Jan. 26, 2018.

(51) Int. Cl.
*G02B 27/09*     (2006.01)
*G02B 6/26*      (2006.01)

(52) U.S. Cl.
CPC ........... *G02B 27/0983* (2013.01); *G02B 6/26* (2013.01); *G02B 27/0927* (2013.01)

(58) Field of Classification Search
CPC ............ G02B 27/0927; G02B 27/0983; G02B 27/0977; G02B 6/26
See application file for complete search history.

(56) References Cited

U.S. PATENT DOCUMENTS 5,574,601 A     11/1996    Hall
6,930,774 B1 *   8/2005    Morrison ................. G01J 3/10
                                                    356/310

(Continued)

FOREIGN PATENT DOCUMENTS

EP      0649042 A2 *  4/1995  ......... G02B 27/0911
WO      2010/128327      11/2010

(Continued)

OTHER PUBLICATIONS

International Search Report and Written Opinion dated May 8, 2019 in corresponding PCT Application No. PCT/US19/14929.

(Continued)

*Primary Examiner* — Thomas A Hollweg
*Assistant Examiner* — Mary A El-Shammaa
(74) *Attorney, Agent, or Firm* — Duane Morris LLP

(57) ABSTRACT

A reflective beam conditioner includes a monolithic body having two or more mirrors and at least one alignment feature. The at least one alignment feature has a predetermined orientation or position with respect to at least one of the two or more mirrors. The two or more mirrors are configured such that, in use, a beam reflects once sequentially off of each of the mirrors. A method of manufacturing such a reflective beam conditioner includes providing a monolithic body. The method further includes restraining the monolithic body to a machining fixture. The method further (Continued)

includes forming a first mirror, a second mirror, and an alignment feature in the monolithic body with the monolithic body restrained in the machining fixture.

21 Claims, 6 Drawing Sheets

(56) References Cited

U.S. PATENT DOCUMENTS

| | | | |
|---|---|---|---|
| 7,209,285 B1 | 4/2007 | Vanstone et al. | |
| 7,229,178 B1* | 6/2007 | Headley | G02B 26/0825 359/847 |
| 2014/0268318 A1* | 9/2014 | Mandella | G02B 21/0048 359/364 |
| 2015/0219854 A1* | 8/2015 | Bhagavatula | G01B 9/0205 385/33 |
| 2017/0162456 A1* | 6/2017 | Owen | H01L 23/544 |
| 2017/0168276 A1* | 6/2017 | Johnson | G02B 17/0856 |
| 2017/0363469 A1* | 12/2017 | Sabry | G01J 3/26 |

FOREIGN PATENT DOCUMENTS

| | | | | |
|---|---|---|---|---|
| WO | 2017/132481 | 8/2017 | | |
| WO | WO-2017132481 A1 * | 8/2017 | | G02B 6/4214 |
| WO | WO-2017218778 A1 * | 12/2017 | | G01J 3/0291 |

OTHER PUBLICATIONS

Extended European Search Report for European Patent Application No. 19743336.0 dated Sep. 23, 2021.

* cited by examiner

REFLECTIVE OPTICAL BEAM CONDITIONERS WITH INTEGRATED ALIGNMENT FEATURES

CROSS-REFERENCE TO RELATED APPLICATIONS

The present application is a U.S. national stage application under 35 U.S.C. § 371 of PCT Application No. PCT/US2019/014929, filed Jan. 24, 2019, which claims priority to U.S. Provisional Application No. 62/622,339, filed on Jan. 26, 2018, the entirety of which is incorporated herein by reference.

FIELD

This invention relates to optics and specifically to beam conditioner systems.

BACKGROUND

Reflective beam conditioner systems include beam expanders, beam deflection devices, telescopes, fiber coupling devices, laser processing machines, and other systems. The alignment of the optical surfaces of such systems is critical to achieving optimal performance and beam quality. Various methods of aligning the optical surfaces can be used. For example, U.S. Pat. No. 5,574,601 describes a system in which the optical surfaces have a common focal point and are machined from a single piece of material.

In systems such as a laser beam expander, acceptable wavefront performance for most applications is achieved when the input beam is parallel to the optical axis and optimal performance is achieved when the input beam is collinear with the optical axis of the system (i.e., on-axis). Two adjustment axes are required to adjust the system's orientation with respect to the input beam such that the input beam is parallel with the optical axis. Two additional adjustment axes are required to also make the input beam collinear with the optical axis. U.S. Pat. No. 7,209,285 discloses the use of a reflective fiducial to adjust the tilt of a secondary mirror with respect to a primary/tertiary mirror assembly to create a telescope system.

SUMMARY

In one embodiment, a reflective beam conditioner is configured to change the intensity profile, divergence, or Rayleigh range of an exit beam with respect to an incoming beam. The reflective beam conditioner includes a monolithic body having two or more mirrors and at least one alignment feature. The alignment feature or features have a predetermined orientation or position with respect to at least one of the two or more mirrors. The two or more mirrors are configured such that, in use, a beam reflects once sequentially off of each of the mirrors.

In another embodiment, a method of manufacturing a reflective beam conditioner includes providing a monolithic body. The method further includes restraining the monolithic body to a machining fixture. The method further includes forming a first mirror, a second mirror, and an alignment feature in the monolithic body with the monolithic body restrained in the machining fixture.

In another embodiment, a reflective beam conditioner includes a monolithic body comprising a mirror and at least one alignment feature that has a predetermined orientation or position with respect to the mirror.

BRIEF DESCRIPTION OF DRAWINGS

The features of the embodiments described herein will be more fully disclosed in the following detailed description, which is to be considered together with the accompanying drawings wherein like numbers refer to like parts and further wherein.

DETAILED DESCRIPTION

Figure 1:
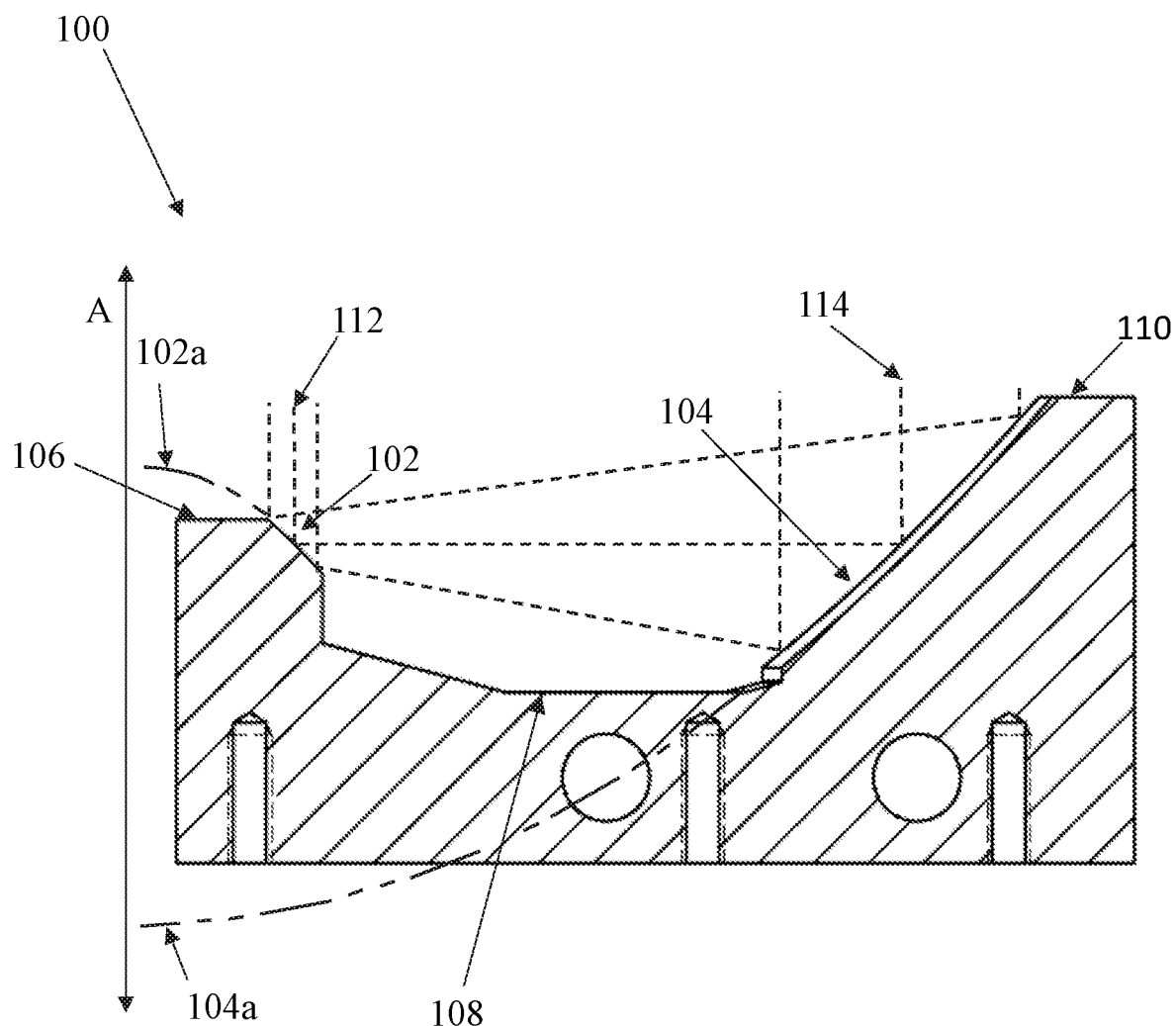
FIG. 1 shows a monolithic beam expander with integrated alignment surfaces which can be used to align the system, according to one embodiment described herein.

The following description is provided as an enabling teaching of a representative set of examples. Many changes can be made to the embodiments described herein while still obtaining beneficial results. Some of the desired benefits discussed below can be obtained by selecting some of the features or steps discussed herein without utilizing other features or steps. Accordingly, many modifications and adaptations, as well as subsets of the features and steps described herein are possible and can even be desirable in certain circumstances. Thus, the following description is provided as illustrative and is not limiting.

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" or "operably connected" is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures. Unless otherwise defined, all technical and scientific terms used herein have the same meaning as commonly understood by anyone of ordinary skill level in the field to which this invention belongs.

As used herein, use of a singular article such as "a," "an" and "the" is not intended to exclude pluralities of the article's object unless the context clearly and unambiguously dictates otherwise.

Disclosed herein are reflective beam conditioners that include one or more optical surfaces and an integrated alignment feature. The reflective beam conditioner can be, for example, a beam expander, telescope, beam deflection device, or fiber coupling device. In various embodiments, the beam conditioner is configured to change the intensity profile, divergence, or Rayleigh range of an exit beam with respect to an incoming beam. The alignment feature(s) are positioned at predetermined positions with respect to the optical surface(s). The integrated alignment feature provides a reference to an optical or mechanical parameter within the system, which aids the alignment of any coupling components (e.g., focusing lenses, fold mirrors, optical filters, etc.), subsystems (e.g., a microscope, digital light processing board, beam shaping assembly, etc.), or light sources (e.g., a laser, arc lamp, light emitting diode, fiber coupled light engine, etc.) to the reflective beam conditioner. These optical and mechanical parameters include, but are not limited to, the optical axis, image location, beam waist location, focus location, and mount position.

In various embodiments, the alignment feature may be formed during the same fabrication process as one or more of the optical surfaces. In at least some embodiments, the beam conditioner is formed from one monolithic piece of material. As a result, the accuracy of the orientation and location of the alignment feature or features with respect to the mirror system is improved significantly. By forming the beam conditioner in a single setup, from a monolithic body, this accuracy is limited only by the tolerances of the fabrication process itself. When using a high precision fabrication process, this accuracy allows the system to be aligned in space to any coupling components, subsystems, or light sources using these alignment features in order to yield optimal performance of the system. In addition, the positional relationship of the various optical components is stable over a range of temperatures and temperature changes.

In the case of a beam expander, for example, the optimal alignment to any coupling components, subsystems, or light sources will be in reference to the optical axis of the beam expander. If it is a beam expander that has an elliptical surface then the distance between this elliptical surface and the waist location of the laser source can also be optimized by having a mechanical reference which is at certain distance from the elliptical mirror surface within the system. Another example, as will be described further herein, is a fiber optic collimator. The optimal alignment of any coupling components, subsystems, or light sources to the collimated output will be in reference to the optical axis of the output beam. In such embodiments, an alignment surface which is machined in the same setup as the collimating mirror will provide a reference to the optical axis for optimal coupling. Furthermore, a monolithic collimator-fiber mount system may be created wherein the mirror surface is machined with respect to an integrated feature which locates the geometric position for optical fiber end to achieve optimal coupling efficiency. This reduces or eliminates the need for costly active alignment, and makes said alignment independent of temperature and changes in temperature.

Implementations of such reflective beam conditioner systems can include systems which contain, for example, flat, spherical, paraboloidal, ellipsoidal, general aspheric, or freeform reflective surfaces. The alignment feature(s) can be any appropriate feature which can be used to align the beam conditioner system, such as, for example, flat and/or planar surfaces, mirror flats, detents, mechanical seats, counter bores and other cylindrical features, or any other appropriate feature. The beam conditioners described herein can be used for any wavelength application, including wavelengths in the UV, visible and infrared ranges. These include wavelengths from 10 nm to 1 mm. The beam conditioners can also include coatings appropriate for the ultraviolet, visible, and infrared spectra, such as protected gold and protected silver. The beam conditioners can be used with any appropriate laser including Nd:YAG lasers, Quantum cascade lasers, Ti:Saphire ultrafast lasers, and fiber lasers at various wavelengths.

In one embodiment, a reflective beam conditioner includes a reflective beam expander and alignment surfaces that can all be fabricated from a single monolithic body and processed in a single machine setup. The beam expander includes a convex paraboloidal mirror and a concave paraboloidal mirror. In one embodiment, the collinear axis of rotation of the mirrors is perpendicular to the plane of each of the alignment surfaces. The optimal field angle of the input beam is parallel to the axis of rotation of the mirrors, thus it is also perpendicular to the planes of the alignment surfaces.

FIG. 1 shows one embodiment of a beam expander 100. The beam expander 100 can be manufactured with high precision using various techniques (e.g., diamond turning, microgrinding, electroforming, EDM (electrical discharge machining), additive manufacturing such as 3D printing, or any other appropriate technique). The beam expander 100 can be formed from any appropriate material. For example, in one embodiment, the beam expander 100 is formed from aluminum. The beam expander 100 includes a first mirror 102 and a second mirror 104. The first 102 and second 104 mirrors can include any suitable coating for reflecting a desired laser. For example, the first 102 and/or second 104 mirrors can include an enhanced aluminum coating, a protected aluminum coating, a bare or protected gold coating, or a protected silver coating. In one embodiment, as shown in FIG. 1, the first mirror 102 is a convex paraboloidal mirror and the second mirror 104 is a concave paraboloidal mirror. A first alignment surface 106 is adjacent to the first mirror 102. A second alignment surface 108 is located at approximately the center of the beam expander 100 and between the first mirror 102 and the second mirror 104. A third alignment surface 110 is adjacent to the second mirror 104. In various embodiments, each of the alignment surfaces 106, 108, 110 are configured to be perpendicular to the optical axis of an input beam 112 and an output beam 114 during use. The first mirror 102 lies on a surface 102a and the second mirror 104 lies on a surface 104a. Both surfaces 102a and 104a may have a common axis of rotation 'A' which is configured to be parallel to the optical axes of the input and output beams. The first 102 and second 104 mirrors are configured such that, in use, the input beam 112 reflects sequentially off of the first mirror 102 and then the second mirror 104 and then away from the beam expander 100.

In various embodiments, the first 102 and second 104 mirrors and the alignment surfaces 106, 108, 110 may be formed from a monolithic body. The parallel and collinear orientation of the axes of rotation of the paraboloidal mirrors 102, 104 and the perpendicular orientation of the alignment surfaces 106, 108, 110 may allow formation of all of these surfaces in a single setup where the axis of rotation of the processing machine (e.g., an axis of rotation of a spindle of a diamond turning machine) is collinear to the axes of rotation of the paraboloidal mirrors 102, 104. As a result, the alignment surfaces 106, 108, 110 can be fabricated with such precision that later adjustment of their orientation and/or position with respect to the first mirror 102, the second mirror 104, or other aspects of the system is not required. In this single setup the mirrors 102, 104 can also be fabricated with such precision with respect to each other that no later adjustment of their orientation within the beam expander is required.

The optimal orientation of the system with respect to input beam 112, and components meant to couple to the output beam 114, can be achieved by using the alignment surfaces 106, 108, 110. For example, the input beam 112 may be aligned to be directed at the first alignment surface 106. The system orientation can then be adjusted until the reflected beam is returned coincident with the input beam 112, perpendicular to the first alignment surface 106, and back into the cavity of the laser. In such a position, the input beam 112 has been oriented to be parallel with the optical axis 'A'. Subsequently, the input beam 112 can be translated to the center of the first mirror 102 to achieve collinearity with the optical axis of the first mirror 102 and optimal wavefront performance from the system. Although alignment of the input beam 112 is described using the first alignment surface 106, it should be understood that the second alignment surface 108 or the third alignment surface 110 may also be used.

As described above, in at least one embodiment, the first mirror 102 and/or the second mirror 104 is paraboloidal. In another embodiment, the first mirror 102 and/or the second mirror 104 is ellipsoidal in shape. In other embodiments, the surface of the first mirror 102 and the second mirror 104 are aspheric, freeform, or any other appropriate surface profile. In addition, various geometries and surface profiles can be combined. For example, first mirror 102 can be aspheric and second mirror 104 can be freeform.

Figure 2:
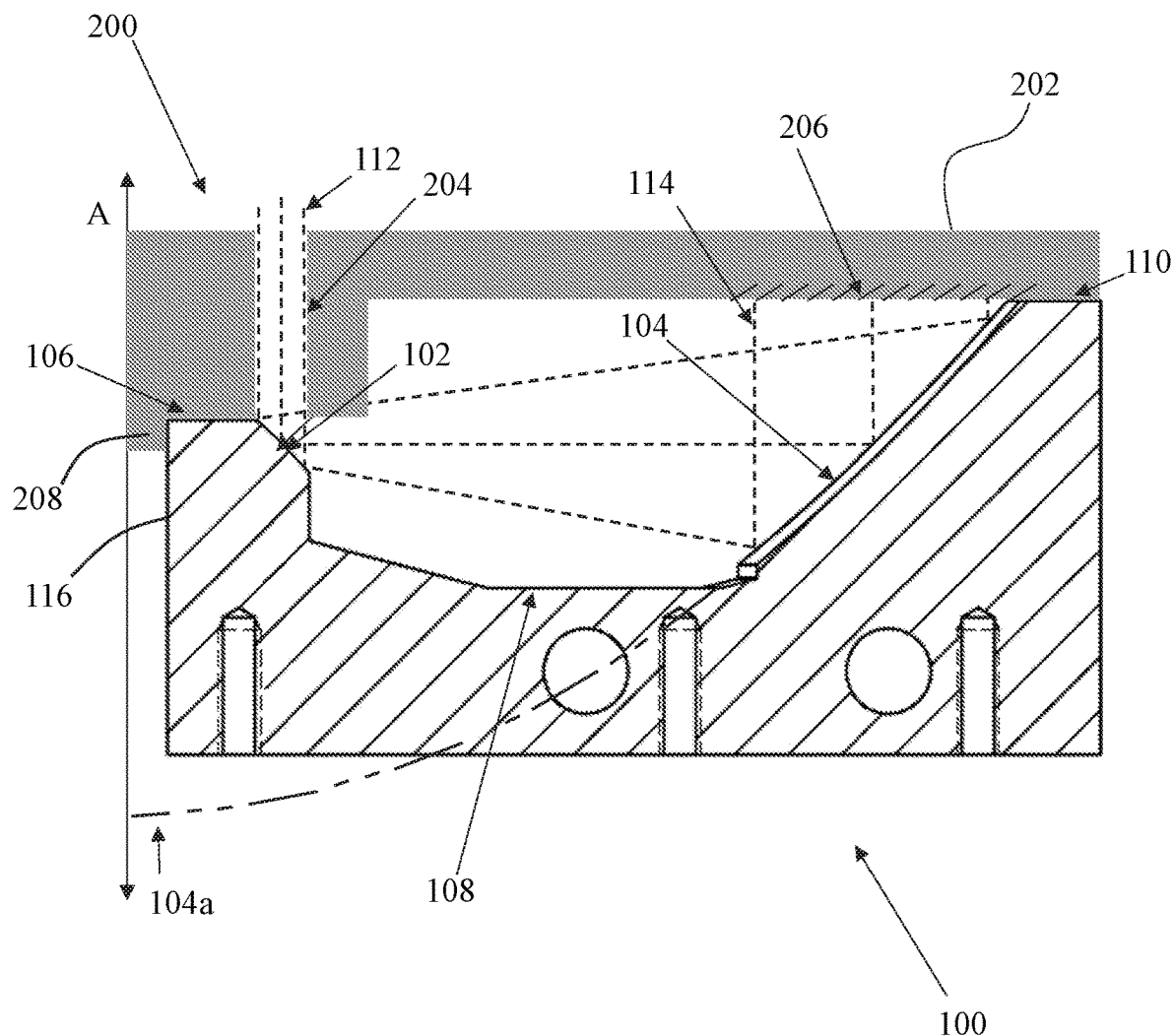
FIG. 2 shows the reflective beam conditioner of FIG. 1 with an alignment guide, according to one embodiment described herein.

Additionally, as shown in FIG. 2, a kit 200 includes the beam expander 100 and a guide 202. The guide 202 is configured to be coupled optically and mechanically to one or more of the alignment surfaces 106, 108, 110 in order to optimally align the system to achieve collinearity in a single alignment step. The guide 202 can be a precision flat mirror that sits across the top of the system as shown in FIG. 2. In various embodiments, the guide 202 contains a through hole 204. In one embodiment, the guide 202 is precision fabricated to match the flatness of the alignment surfaces 106, 108, 110. In various embodiments, the guide 202 includes a mirrored portion 206 that has a mirror finish configured to reflect the beam from the second mirror 104. The guide 202 contacts the first alignment surface 106 and the third alignment surface 110. In addition, a shoulder 208 of the guide 202 contacts a wall 116 of the beam expander 100 to position the guide 202 such that the through hole 204 is positioned over the center of the first mirror 102. In various embodiments, the wall 116 may be formed in the same machining setup as the alignment surfaces 106, 108, 110 and the first and second mirrors 102, 104. Hence, the position of the wall 116 with respect to the first 102 and second 104 mirrors (and their respective axes of rotation) can be accurately controlled. As a result, the position of the guide 202 with respect to the first 102 and second 104 mirrors is controlled and the input beam 112 can be easily aligned to be collinear with the optical axis of the system.

It should be understood that any of a variety of features can be used to align the through hole 204 of the guide 202 with the first mirror 102. For example, the beam expander 100 can include a hole and the guide 202 can include a pin configured to engage the hole to align the guide 202. The pin can be integrally formed with the body of the guide 202 or, alternatively, can be a separate component that is, for example, pressed into the guide body. In another embodiment, the beam expander 100 includes a pin configured to engage a hole on the guide 202. Any other appropriate form of alignment can be used.

When properly aligned, the input beam 112 that enters the beam expander is reflected by the first mirror 102 to the second mirror 104. The second mirror 104 then reflects the output beam 114 parallel to the input beam 112. The output beam 114 is also configured to be perpendicular to the third alignment surface 110 and the second alignment surface 108. Any components and subsystems that need to be aligned to the output beam 114 can be aligned optically or mechanically to second alignment surface 108 or third alignment surface 110, as well as the first alignment surface 106.

Figure 3:
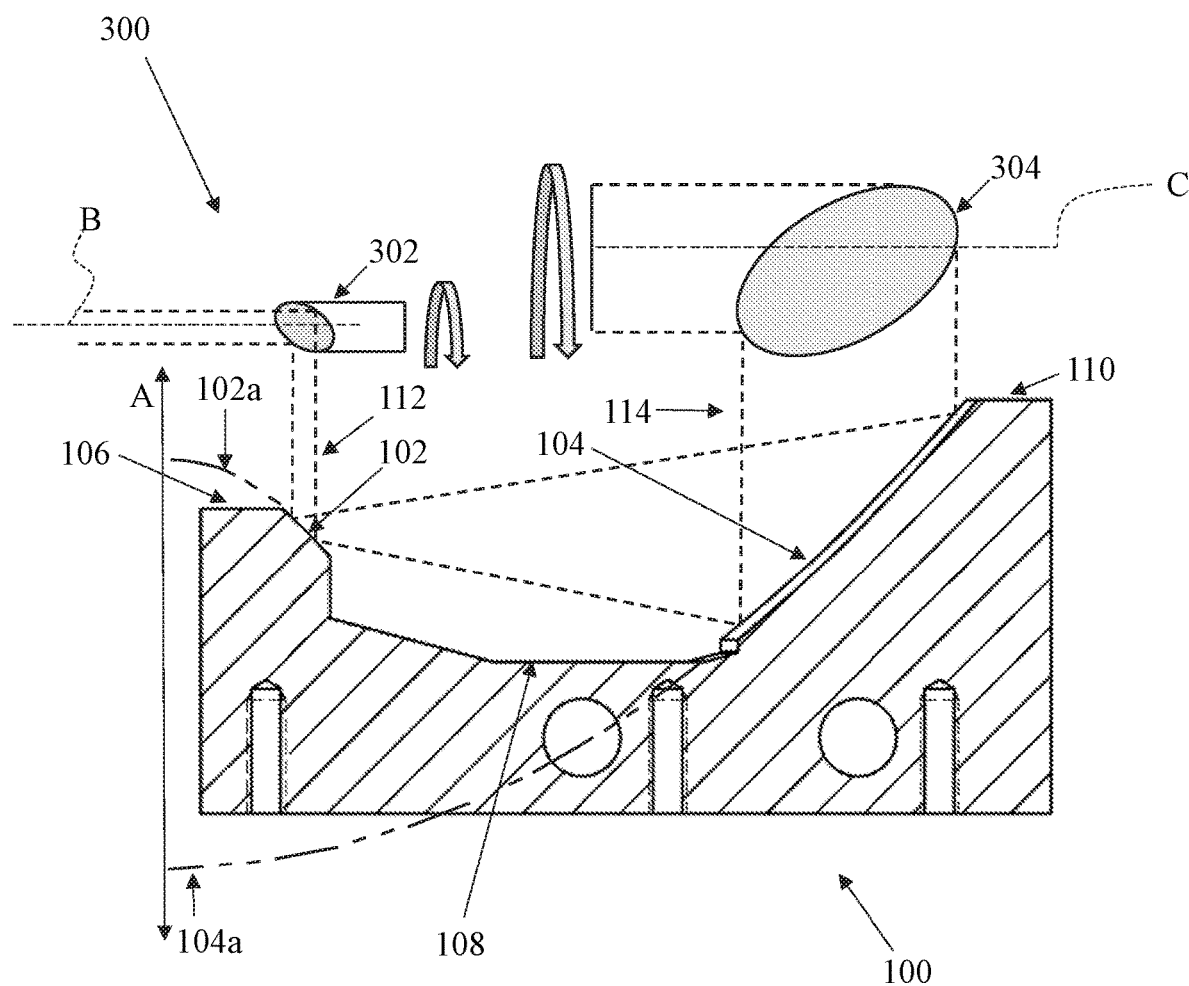
FIG. 3 shows a reflective beam conditioner system including the monolithic beam expander of FIG. 1, according to one embodiment described herein.

In another embodiment, as shown in FIG. 3, a reflective beam conditioner system 300 includes the reflective beam expander 100 and at least one deflection mirror. In various embodiments, the system 300 includes an input deflection mirror 302 and an output deflection mirror 304. During operation, the input deflection mirror 302 is used to direct the input beam 112 into the first mirror 102 of the reflective beam expander. This can be useful when the input beam 112 cannot otherwise be oriented parallel to the axis of rotation of the first mirror 102. The input deflection mirror 302 is able to rotate around an axis of rotation "B" that is parallel to the alignment surfaces 106, 108, 110. In various embodiments, the output deflection mirror 304 may be used to direct the output beam 114 from the second mirror 104 of the reflective beam expander 100. The output deflection mirror 11 is able to rotate around axis of rotation "C" which is parallel to the alignment surfaces 106, 108, 110.

Figure 4:
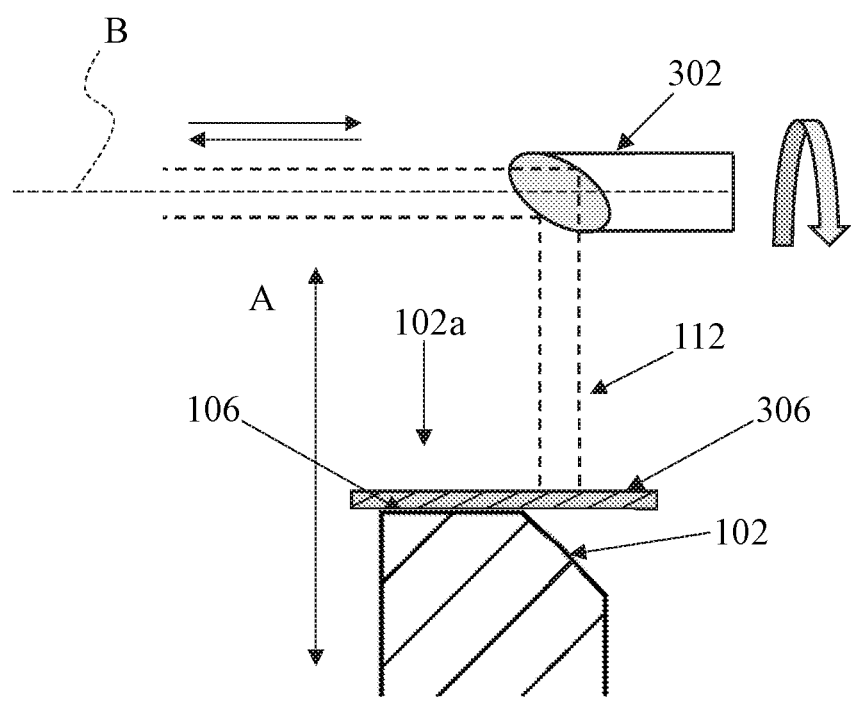
FIG. 4 is a detail view of the reflective beam conditioner system of FIG. 3 with an extended flat coupled to the monolithic beam expander.

The alignment surfaces 106, 108, 110 provide a reference for aligning the orientation of the deflection mirrors 302, 304 with respect to the reflective beam expander 100. The alignment of the input deflection mirror 302 is shown in detail in FIG. 4. The angular position of the deflection mirrors 302, 304 about their axis of rotation and the orientation of the axis of rotation itself can be calibrated using an extended mirror flat 306 placed on an alignment surface (e.g., first alignment surface 106). This allows the input beam 112 to be retro reflected back on itself when the angle of the input deflection mirror 10 is oriented properly (e.g., at 45 degrees) with respect to the extended mirror flat 306 and, hence, the input beam 112 is oriented parallel to the axis of rotation of the first mirror 102. In addition, this offers the option of mechanically coupling the mount or holder of the rotating deflection mirror 302 to the alignment surfaces 106, 108, 110 so as to ensure parallelism without the need for further alignment.

Figure 5:
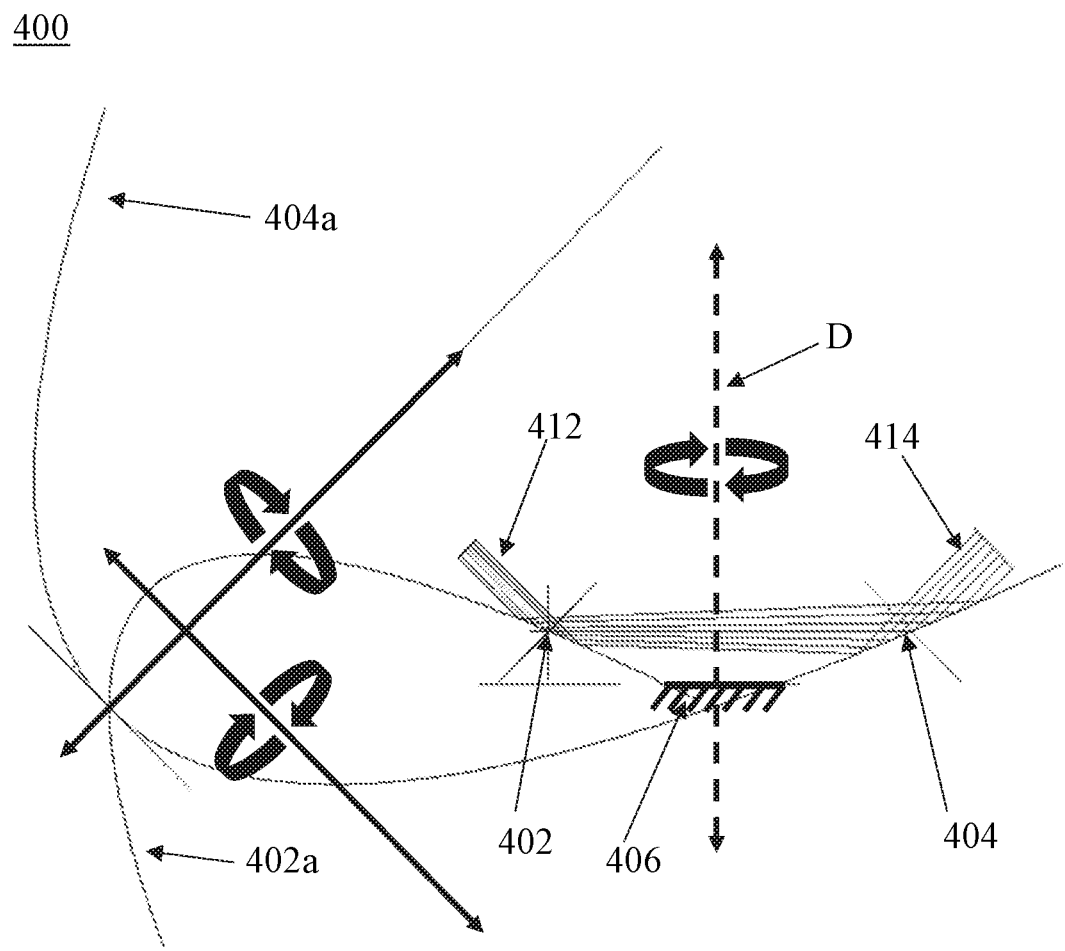
FIG. 5 shows a monolithic beam conditioner, according to one embodiment described herein.

In another embodiment, as shown in FIG. 5, a reflective beam conditioner 400 includes a first mirror 402 on a first surface 402a, a second mirror 404 on a second surface 404a, and an alignment surface 406. In the embodiment of FIG. 5, the axes of the mirrors 402, 404 are not collinear, however the mirror surfaces themselves are located around a common rotation axis "D." Hence, the first mirror 402, second mirror 404, and alignment surface 406 may be manufactured in a single machine setup, as described above with reference to reflective beam expander 100. As shown in FIG. 5, in various embodiments, the input 412 and output 414 beams are not orthogonal to one another, nor to any reference flats or feature. However, the angle between the alignment surface 406 and the desired input beam 412 axis is known. Hence, the alignment surface 406 may serve as a guide for alignment. As described above with reference to reflective beam expander 100, the mirrors 402, 404 can have any appropriate geometry. In addition, the reflective beam conditioner 400 can be formed from a monolithic body and the mirrors 402, 404 and alignment surface 406 can be manufactured in the same setup so that their alignment with respect to each other and any alignment feature is accurate to the level of the manufacturing process. The reflective beam conditioner 400 can be formed from any appropriate material. For example, in one embodiment, the reflective beam conditioner 400 is formed from aluminum. The first 402 and second 404 mirrors can include any suitable coating for reflecting a desired laser. For example, the first 402 and/or second 404 mirrors can include an enhanced aluminum coating, a protected aluminum coating, a bare or protected gold coating, or a protected silver coating.

Figure 6A:
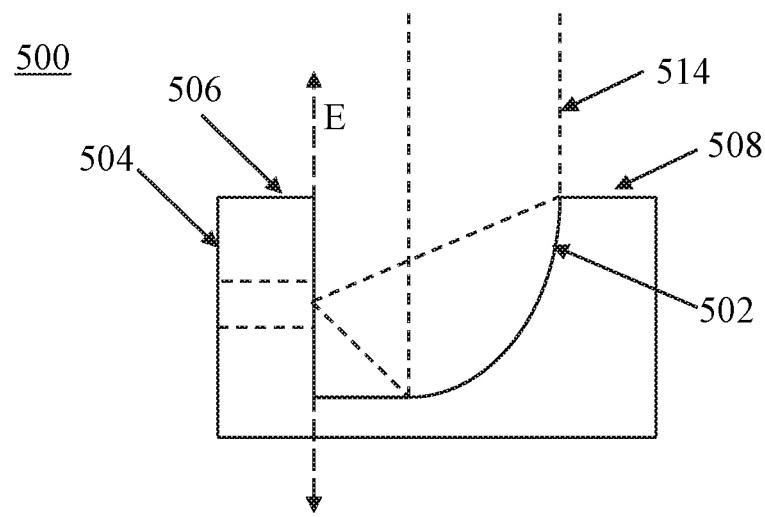
FIG. 6A shows a front view a reflective fiber collimator system with alignment features, according to one embodiment described herein.
Figure 6B:
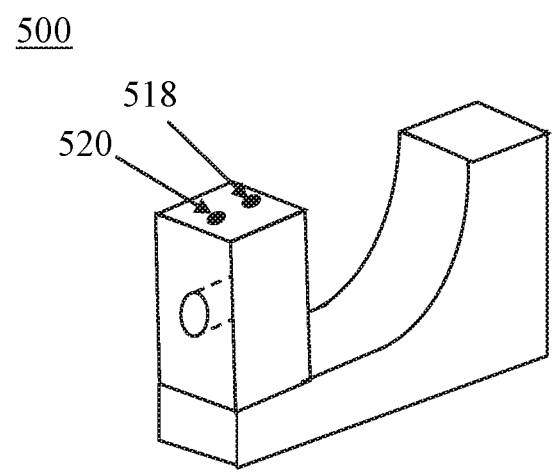
FIG. 6B is a perspective view of the reflective fiber collimator system of FIG. 6A.

In another embodiment, shown in FIGS. 6A and 6B, a reflective fiber collimator system 500 includes a paraboloidal collimating mirror 502 and an optical fiber mount 504. The reflective fiber collimator system 500 can be formed from any appropriate material. For example, in one embodiment, reflective fiber collimator system 500 is formed from aluminum. The paraboloidal collimating mirror 502 can include any suitable coating for reflecting a desired laser. For example, the paraboloidal collimating mirror 502 can include an enhanced aluminum coating, a protected aluminum coating, a bare or protected gold coating, or a protected silver coating. The fiber collimator system 500 may also include a first alignment surface 506 on top of the fiber mount 504 and a second alignment surface 508 adjacent the paraboloidal collimating mirror 502, as shown in FIG. 6A. The first alignment surface 506 and the second alignment surface 508 are parallel to each other and to the axis of the cone of light collected by the paraboloidal mirror 502. The alignment surfaces 506, 508 and the cone of light are orthogonal to the axis of rotation of the mirror 'E'. The second alignment surface 508 serves as a surface with respect to which additional optical components (e.g., focusing lenses, fold mirrors, optical filters, etc.) or subsystems (e.g., a microscope, digital light processing board, beam shaping assembly, etc.) can be aligned. These optical components or subsystems can be optically and/or mechanically coupled to the collimated output beam 514. The first alignment surface 506 provides a reference to which the fiber can be aligned, thereby controlling rotation within the plane which is orthogonal to the axis of rotation of the mirror. Additionally, alignment surface 506 can provide a precision reference to determine the location of the focal point of the paraboloidal mirror 502.

As shown in FIG. 6B, the reflective beam conditioner can also include a first reference mark 518. The first reference mark 518 can be, for example, located on the first alignment surface 506. The inclusion of a first reference mark 518 that is coincident with the axis of rotation of the paraboloidal mirror 502 provides a two dimensional spatial reference to the axis of rotation in the plane of the first alignment surface 506. This provides a reference for two of the dimensions of the focal point of the paraboloidal mirror 502. This allows the tip of the fiber to be positioned such that it is coincident with the focal point of the mirror 502 for optimal coupling efficiency. These references provide the position and orientation of the coupling fiber at which the highest coupling efficiency will be reached for 5 of the fiber's 6 degrees of freedom. As a result, the alignment features and reference mark allow for a precision accessory to be positioned against the first alignment surface 506, located according to the first reference mark 518, and at a height equal to the distance between first alignment surface 506 and the focal point of the paraboloidal mirror 502. In one embodiment, the first reference mark 518 is positioned at the axis of rotation 'E'. In such embodiments, the first reference mark 518 can be features such as a counter bored hole or a cylindrical surface, which are centered on the axis of rotation 'E'. In some embodiments, first alignment surface 506 includes a second reference mark 520 a predetermined distance from the first reference mark 518 and the paraboloidal mirror 502. In such an embodiment, reference to all 6 degrees of freedom is present, and the fiber tip may be controlled in all 6 degrees of freedom.

In various embodiments, as described above, the beam conditioners described herein may be formed from a monolithic body. In various embodiments, the monolithic body is formed from a composite element joined prior to machining (or formation by other means) of the mirrors and alignment features. In other words, the beam conditioner can be formed of two or more elements joined together. The two or more elements can be of the same material or, alternatively, a different material. For example, the two or more elements can be joined by bonding, welding, press-fit, fasteners (such as screws, rivets, etc.), or any other appropriate means. The mirrors and alignment surfaces can be formed after joining of the two or more elements such that the relative position of the mirrors, alignment surfaces, and mount are fixed.

For example, in one embodiment, a reflective beam conditioner includes a reflective fiber collimator. The reflective fiber collimator includes a mirror for collecting and collimating diverging light from a connectorized optical fiber. The mirror is paraboloidal and defines an axis of rotation. The reflective fiber collimator further includes a fiber mount for aligning the connectorized optical fiber with respect to the paraboloidal mirror, the fiber mount defining a longitudinal axis. The beam conditioner further includes one or more alignment surfaces. The mirror, the fiber mount, and the one or more alignment surfaces are included on a monolithic composite element. The mirror, the fiber mount, and the one or more alignment surfaces are formed in a single fabrication process.

In another embodiment, a method of manufacturing a reflective beam conditioner includes providing a monolithic body. The method further includes restraining the monolithic body to a machining fixture. The method further includes forming a first mirror, a second mirror, and an alignment feature in the monolithic body with the monolithic body restrained in the machining fixture. The first mirror, second mirror, and alignment feature can be formed using any appropriate manufacturing technique. For example, the features can be formed using diamond turning. In one embodiment, the alignment feature is an alignment surface (e.g., alignment surfaces 106, 108, 110, 406, 506, 510). In various embodiments, the first mirror has a first axis of rotation, the second mirror has a second axis of rotation, and the alignment surface is orthogonal to both the first axis of rotation and the second axis of rotation. In various embodiments, the first axis of rotation and the second axis of rotation are collinear.

While various embodiments are described herein, it is to be understood that the embodiments described are illustrative only and that the scope of the subject matter is to be accorded a full range of equivalents, many variations and modifications naturally occurring to those of skill in the art from a perusal hereof

What is claimed is:

1. A reflective beam conditioner comprising:
a monolithic body including two or more mirrors, which are co-fabricated with an alignment feature having a predetermined orientation or position with respect to one of the two or more mirrors, to change one of the intensity profile, divergence, and Rayleigh range of an exit beam with respect to an incoming beam; wherein
the two or more mirrors are configured such that, in use, the incoming light beam reflects once sequentially off of each of the two or more mirrors, and
the alignment feature is a reference to an optical or mechanical parameter within a system that aids alignment of coupling components.

2. The reflective beam conditioner of claim 1, wherein:
the two or more mirrors include:
a first mirror having a first axis of rotation, the first mirror being paraboloidal; and
a second mirror having a second axis of rotation, the second mirror being paraboloidal, the second axis of rotation having a known orientation with respect to the first axis of rotation;
wherein one of the first mirror and the second mirror is convex and the other is concave; and
the alignment feature includes at least one alignment surface.

3. The reflective beam conditioner of claim 2, wherein the alignment feature is orthogonal to the first axis of rotation and the second axis of rotation.

4. The reflective beam conditioner of claim 3, wherein the first axis of rotation and the second axis of rotation are collinear.

5. The reflective beam conditioner of claim 2, wherein one of the first mirror and the second mirror is ellipsoidal.

6. The reflective beam conditioner of claim 2, wherein both the first mirror and the second mirror are ellipsoidal.

7. The reflective beam conditioner of claim 2, wherein one of the first mirror and the second mirror is a general aspheric surface.

8. The reflective beam conditioner of claim 2, wherein both of the first mirror and the second mirror are general aspheric surfaces.

9. The reflective beam conditioner of claim 2, wherein one of the first mirror and the second mirror is a freeform surface.

10. The reflective beam conditioner of claim 2, wherein both the first mirror and the second mirror are freeform surfaces.

11. A method of manufacturing a reflective beam conditioner, the method comprising:
providing a monolithic material and a processing machine having an axis of rotation;
restraining the monolithic material to a machining fixture located along a rotational axis of the processing machine; and
forming a monolithic body, a first mirror, a second mirror, and an alignment feature in the monolithic material in a single setup such that the axis of rotation of the processing machine is collinear to axes of rotation of the first mirror, the second mirror, and the alignment feature while the monolithic material is restrained in the machining fixture.

12. The method of claim 11, wherein the alignment feature is an alignment surface.

13. The method of claim 12, wherein the first mirror has a first axis of rotation, the second mirror has a second axis of rotation, and the alignment surface is orthogonal to both the first axis of rotation and the second axis of rotation.

14. The method of claim 13, wherein the first axis of rotation and the second axis of rotation are collinear.

15. A reflective beam conditioner comprising:
a monolithic body including a mirror, an alignment feature, which is co-fabricated with the mirror so that the alignment feature has a predetermined orientation or position with respect to the mirror, to change one of the intensity profile, divergence, and Rayleigh range of an exit beam with respect to an incoming beam, and a fiber mount to mount an optical fiber, wherein
the alignment feature provides a reference to which the optical fiber can be aligned or provides a reference to determine a location of a focal point of the mirror.

16. The reflective beam conditioner of claim 15, wherein:
the fiber mount aligns a connectorized optical fiber with respect to the mirror, the fiber mount defining a longitudinal axis, and
the mirror is paraboloidal and defines an axis of rotation and is configured to collect and collimate diverging light from the connectorized optical fiber, and
the alignment feature includes an alignment surface.

17. The reflective beam conditioner of claim 16, wherein the alignment surface is orthogonal to the axis of rotation of the mirror.

18. The reflective beam conditioner of claim 17, wherein the alignment surface is a portion of a top surface of the fiber mount.

19. The reflective beam conditioner of claim 18, wherein the monolithic body further includes a reference mark on the top surface of the fiber mount, the reference mark providing a two dimensional spatial reference to the axis of rotation of the mirror in a plane perpendicular to the axis of rotation.

20. The reflective beam conditioner of claim 16, wherein the mirror is a general aspheric surface.

21. The reflective beam conditioner of claim 15, wherein the monolithic body is a composite body that is assembled before the mirror and the alignment feature are defined in the monolithic body.

* * * * *